July 14, 1953     O. KERSEY     2,645,522
DUMPING TRUCK

Filed Feb. 7, 1951     3 Sheets-Sheet 1

INVENTOR.
OWEN KERSEY
BY
ATT'Y

July 14, 1953 — O. KERSEY — 2,645,522
DUMPING TRUCK

Filed Feb. 7, 1951 — 3 Sheets-Sheet 2

INVENTOR.
OWEN KERSEY
BY
ATT'Y

July 14, 1953     O. KERSEY     2,645,522
DUMPING TRUCK

Filed Feb. 7, 1951     3 Sheets-Sheet 3

INVENTOR.
OWEN KERSEY
BY
*Ulrie & J Dunbar*
ATT'Y

Patented July 14, 1953

2,645,522

UNITED STATES PATENT OFFICE 2,645,522

DUMPING TRUCK

Owen Kersey, Lemoyne, Pa.

Application February 7, 1951, Serial No. 209,874

4 Claims. (Cl. 298—23)

This invention relates to truck bodies and more particularly to the mounting and control of the gates of dump trucks.

An important object of the invention is the provision of a control and mounting for the gates of dump trucks so constructed that the gate may be optionally opened by pivotal movement about either its upper or lower end and wherein the opening of the gate when pivoting at its upper end is under power control as to both the extent of its opening and the direction of the movement whereby the truck body may be used in spreading crushed stone, sand or the like and the discharge of the material begun or terminated at will, and, whereby the truck may be used for general delivery purposes as well as in dumping capacity.

Another object of the invention is the provision of means whereby the width of discharge may be controlled during a spreading operation.

Still another object of the invention is the provision of a structure embodying the features which may be readily adapted to present day dump truck bodies without any material change therein.

These and other objects I attain by the construction shown in the accompanying drawings wherein for the purpose of illustration I have shown a preferred embodiment of my invention and wherein.

Figure 1:
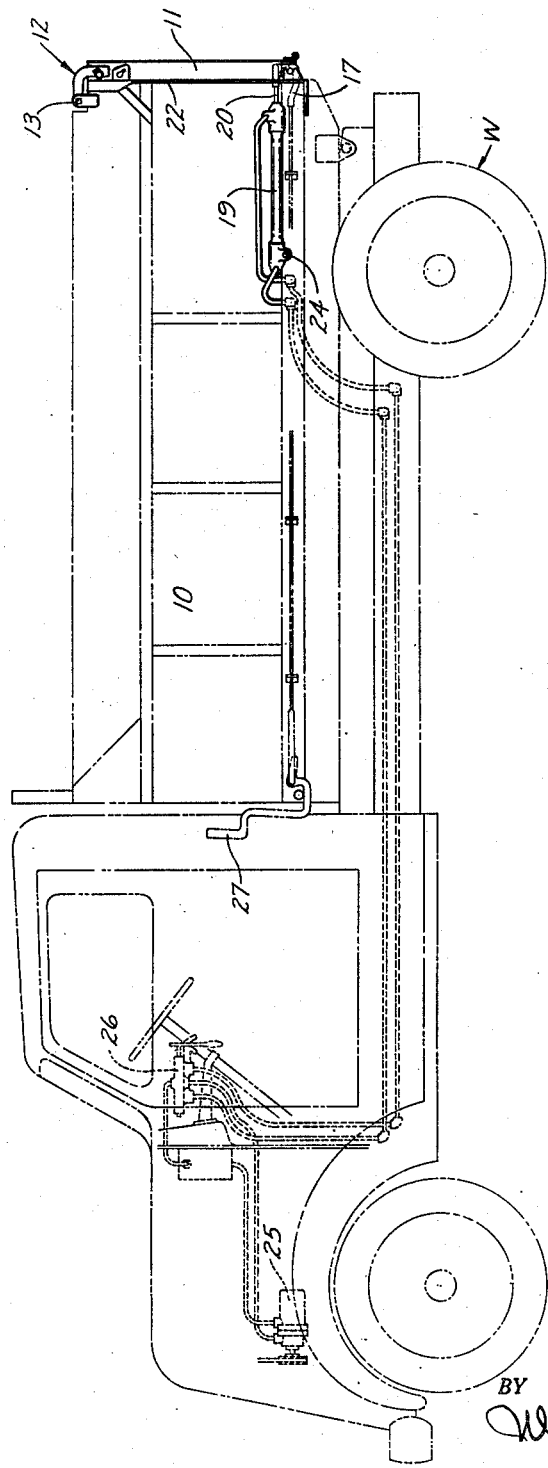
Figure 1 is a semi-diagrammatic side elevation illustrating the application of my invention to a dump truck.

Referring now more particularly to the drawings the truck body 10 may be of any desired type and may be equipped with any suitable dumping gear (not shown). The tail gate 11 is at its upper end on hinges 12 the pintles 13 of which are removable. At its lower end the gate is provided at its sides with alined pins 14 and the adjacent portions of body 10 have brackets 15 the rear faces of which are notched at 16 to receive pins 14. Coacting with these brackets are latch elements 17 which in their forward positions confine the pins 14 in notches 16 and coact with the brackets 15 to form a bearing in which the pins 14 may rotate permitting the gate to be opened from its upper end. The angular position of the gate may at this time be regulated by the usual flexible restraining members, usually chains 18.

In accordance with my invention I pivot at each side of body 10 the forward end of a pressure cylinder 19 the rod 20 of which extends through a vertically elongated slot 21 in vertical guide bracket 22 and is rigidly secured to an arm 23 pivoted on the adjacent lower pin 14 of tail gate 11. The pivotal mounting of the cylinder at 24 and the pivotal connection of its rod to the tail gate 11 permit the necessary movement of the cylinder as the tail gate is opened or closed by pressure exerted by cylinders 19. A pump 25 supplies pressure to cylinders 19 through a control valve 26 preferably located in the cab of the vehicle. Pump 25 is of any suitable type providing adequate and continuing pressure and valve 26 is of the type controlling not only the delivery of pressure to either end but the maintenance of pressure to hold the rods 20 in selected position.

Figure 2:
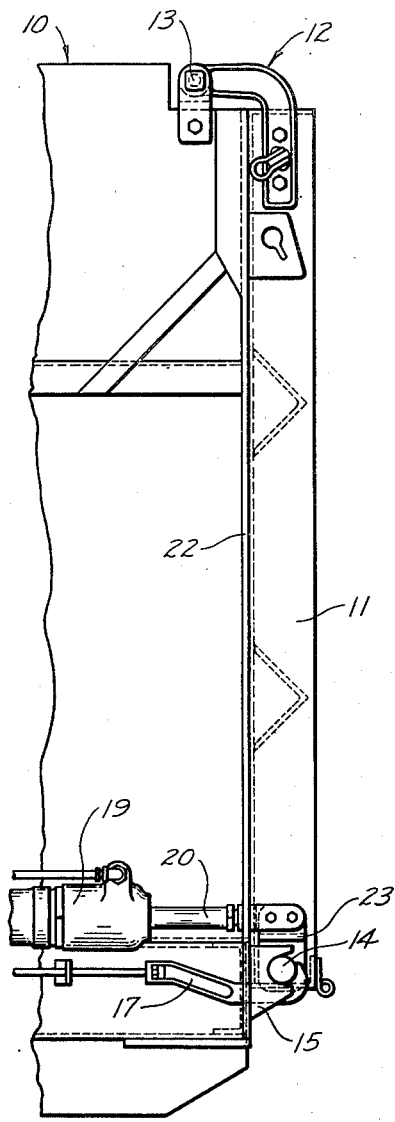
Figure 2 is an enlarged side elevation of the rear end of the truck body and its controls.
Figure 3:
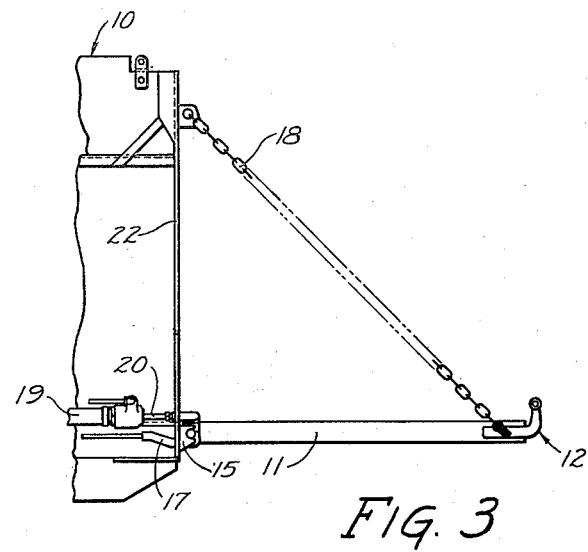
Figure 3 is a view similar to that of Figure 2 the tail gate being opened from its upper end and positioned to form a continuation of the bed of the body.
Figure 6:
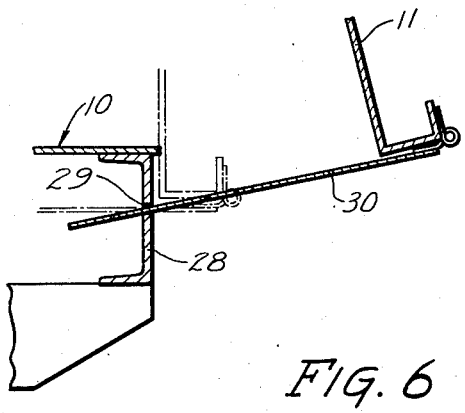
Figure 6 is an enlarged section on line 6—6 of Figure 5.
Figure 5:
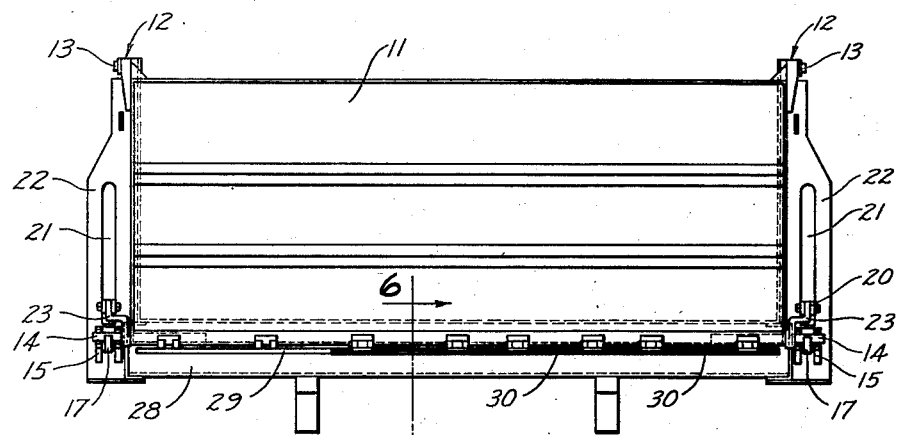
Figure 5 is a rear elevation of the truck body.
Figure 4:
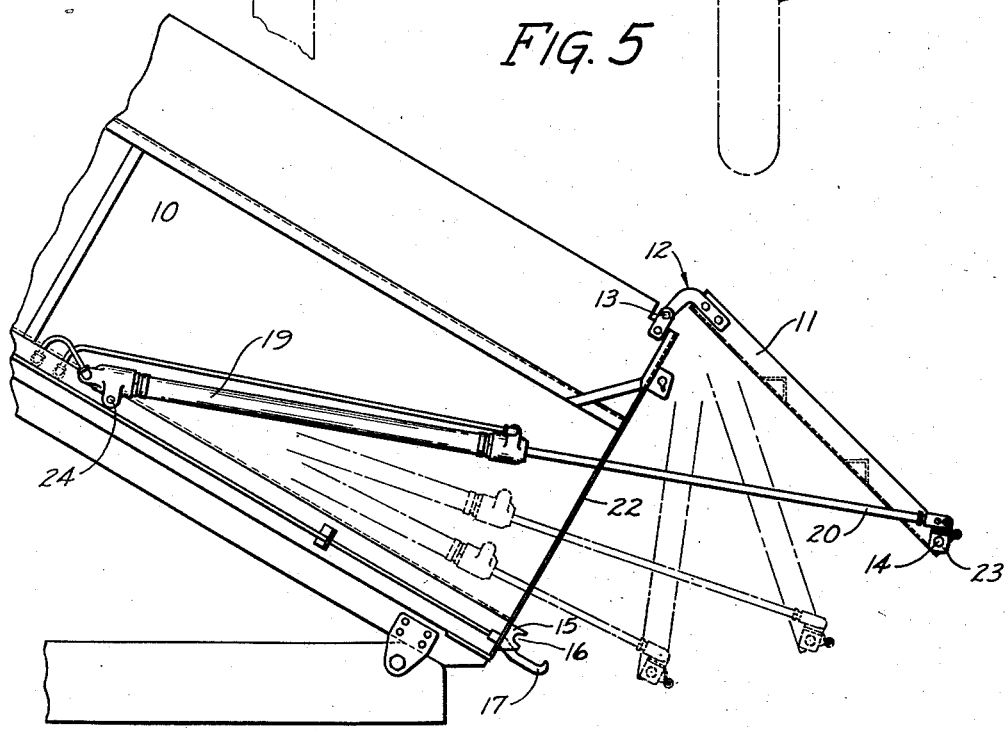
Figure 4 is a fragmentary side elevation with the truck body in dumping position and illustrating several of the various positions which may be given the tailgate by the power control.

In use of the truck body for ordinary hauling the tailgate 11 may be in any of the positions between the closed position of Figures 1 and 2 and the horizontal position of Figure 3 where it forms a continuation of the truck bed, changing from one to another of these by pivoting on the hinges formed by the brackets 15, pins 14 and latches 17. For use in dump or spreader hauling the pivots 13 are in position and during transportation from loading to disposal point the parts are in position of Figures 1 and 2, the rods 20 being fully drawn into their cylinders and the latches 17 holding the pins 14 in position in brackets 15. At the dispersal point the latches 17 are released by means of handle 27 and the body 10 is moved to dumping position (Figure 4) the tail gate being held closed by the rods 20. If the full load is to be dumped at one spot the gate is fully opened by operation of valve 26. Where the material is to be spread at a desired thickness over an extended surface (a condition often met with in road construction and repair) the gate is slightly opened and held in its selected position by valve 26 and the truck is propelled over the area at a speed such that the desired layer of material is deposited. Since such deposits are ordinarily made on a freshly oiled or tarred surface it is preferred that the truck body at least as to the rear end thereof be of a width such that it extends beyond the rear wheels W as suggested in Figure 5. It is often the case, particularly in road repair work that the load must be delivered to a series of spaced areas. In this case, having completed delivery at one area, the operator merely adjusts the valve 26 to close the tail gate and moves to the next area. The pressure of the cylinders will move the gate toward its closed position until the flow of material substantially stops during transportation particularly if the body 10 is lowered to its normal position shown in Fig. 1 while moving from one area to another.

Often it is desirable to deposit a layer of this sort in a band of a width less than that of the truck body. To enable delivery of a band of this character which is adjustable as to width I provide the rear sill 28 of the body 10 with a longitudinal slot 29. Removably pivoted to tail gate 11 is a series of plates 30 the forward ends of which are directed through and slidable in slot 29. It will be obvious that these plates will cut off the flow of material for the desired width and location without regard to the extent of opening of gate 11. The tail gate 11 is of course actuated and controlled by hydraulic cylinders 19 and thus the gate 11 may be held in any desired position between fully closed and opened an amount permitted by the length of plates 30 while the latter are held in slot 29.

It will be obvious from the foregoing that with my apparatus the dump truck body is not only capable of use for general hauling but is capable of extended and widely varied use in dump hauling and material spreading. It will also be obvious that the structure illustrated is capable of considerable modification and I do not wish to limit myself thereto except as hereinafter claimed.

I claim:

1. Operating means for the tail gate of a vehicle body and comprising in combination, a vehicle body, a tail gate for closing one end of said body, disconnectible means pivotally connecting the upper end of said tail gate to the sides of said body, pivot pins connected to and projecting coaxially in opposite directions from the lower end of said tail gate, said pins being perpendicular to the sides of said body and projecting respectively beyond the planes of said sides, a pair of hydraulic cylinder and piston units disposed on the exterior of opposite sides of said body and one end of each unit being pivotally connected to one side of said body appreciably forwardly of said tail gate and the opposite ends of said units having bearing apertures respectively pivotally receiving said pivot pins, a source of hydraulic power connected to opposite ends of each cylinder, a control valve operable to cause said hydraulic units to operate in unison to move said tail gate between closed and a predetermined maximum open position, a notched bracket on each side of said body arranged respectively to receive said pivot pins when said tail gate is closed, and a latch associated with each bracket and operable to pivotally and releasably hold said pivot pins within the notches of said brackets, said pivotal connecting means at the upper end of said tail gate being disconnectible selectively to permit said tail gate to be pivotally supported at its lower edge by said pins and brackets.

2. The operating means set forth in claim 1 further including vertical guide brackets extending transversely outwardly from the sides of said body, said brackets being vertically slotted, and a piston rod comprising part of each hydraulic unit extending through said slots of said brackets and the outer ends of said piston rods respectively having a bearing pivotally receiving one of said pins.

3. In combination with a tiltable dump truck body having a slotted rear sill, a tail gate pivotally connected at its upper end to one end of said body, means operable selectively to move and hold the lower end of said tail gate away from the end of said body a desired amount to form a discharge opening and permit material to be discharged therethrough from said body, and plate-like elements arranged to be pivotally and detachably connected to the bottom edge of said tail gate for movement about an axis parallel thereto and extend therefrom through said slotted sill for support thereby, said plates being selectively positionable relative to the width of said truck body to close any desired portion of said discharge opening and thereby permit transversely restricted discharge from said body.

4. The combination recited in claim 3 further characterized by the tail gate moving and holding means comprising hydraulic units arranged on opposite sides of said body and pivotally connected at the opposite ends thereof respectively to said sides of said body and the lower end of said tail gate.

OWEN KERSEY.

References Cited in the file of this patent

UNITED STATES PATENTS

| Number | Name | Date |
| --- | --- | --- |
| 1,416,975 | Pullar | May 23, 1922 |
| 1,446,083 | Avery | Feb. 20, 1923 |
| 1,828,797 | Becker | Oct. 27, 1931 |
| 1,961,193 | Brumbaugh | June 5, 1934 |
| 2,220,202 | Bohne | Nov. 5, 1940 |
| 2,239,029 | Barrett | Apr. 22, 1941 |
| 2,248,374 | Mitchell | July 8, 1941 |
| 2,344,755 | Venard | Mar. 21, 1944 |
| 2,410,046 | Burns | Oct. 29, 1946 |